(12) United States Patent
Nikom

(10) Patent No.: US 6,342,877 B1
(45) Date of Patent: Jan. 29, 2002

(54) METHOD FOR CONSTRAINED CURSOR MOVEMENT

(75) Inventor: Jacob S. Nikom, Needham, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/329,470

(22) Filed: Jun. 10, 1999

(51) Int. Cl.[7] .................................................. G09G 5/08
(52) U.S. Cl. .................................................... 345/157
(58) Field of Search ................................ 345/145, 156, 345/157, 161, 163, 167

(56) References Cited

U.S. PATENT DOCUMENTS

| | | | |
|---|---|---|---|
| 4,114,034 A | * | 9/1978 | Hunka ........................ 250/202 |
| 5,327,528 A | * | 7/1994 | Hidaka et al. ............... 395/155 |
| 5,333,247 A | * | 7/1994 | Gest et al. ................... 395/138 |
| 5,490,241 A | * | 2/1996 | Mallgren et al. ........... 395/140 |
| 5,745,099 A | * | 4/1998 | Bolmqvist ................... 345/145 |
| 6,040,821 A | * | 3/2000 | Franz et al. ................. 345/159 |

* cited by examiner

Primary Examiner—Almis R. Jankus
Assistant Examiner—G. F. Cunningham
(74) Attorney, Agent, or Firm—Dirk Brinkman

(57) ABSTRACT

A method moves a cursor on a display screen. The motion of a pointing device is determined. The motion has direction and magnitude components. A determination is made to see if the direction lies within angular limits specified for a reference direction. The reference direction being either horizontal or vertical. If the direction of the pointing device lies within the limits, then the magnitude of the motion of the pointer is multiplied by the angle to determine the motion of the cursor.

2 Claims, 2 Drawing Sheets

METHOD FOR CONSTRAINED CURSOR MOVEMENT

FIELD OF THE INVENTION

The present invention relates generally to constraining the movement of a cursor on a display device in response to movement of a mouse or trackball.

BACKGROUND OF THE INVENTION

There are two very common user activities where a cursor controlled by a pointing device, for example, a mouse or trackball, has to moved horizontally or vertically on an output device such as a display terminal. In one activity, text or graphics are scrolled in either a horizontal or vertical direction using either a horizontal or vertical scroll bar. Oblique scroll bars are non-existing. In another activity, portions of horizontal text on one or more lines is "highlighted" for some text editing function by "clicking" a button while moving the pointing device.

Both of these activities can cause tracking problems. In the case of the scroll bar, unless the user carefully keeps the cursor aligned with the scroll bar, the cursor will become "disconnected" from the bar. When the cursor is disconnected, the scroll bar no longer responds to movement by the pointing device. For text highlighting, careless movement of the cursor will select the wrong portions of the text.

Successful accomplishment of either activity requires near perfect vertical or horizontal movement of the pointing device. Any drifting from horizontal or vertical movement will cause problems. Known pointing devices, such as a mouse, trackball, or joystick, are not designed to track a cursor in a specific direction, nor are such devices aware of the motion required by the underlying application.

Hidaka et al. in U.S. Pat. No. 5,327,528 teach a cursor control system where graphics objects are tracked by pointing to a position on a display screen, and locating a point on a graphics which is near to position of the screen, and then displaying the cursor at that position.

Gest et al. in U.S. Pat. No. 5,333,247 described a scrolling tool for text and graphics. There, a box of appropriate size is superimposed on the screen. The text or graphics in the box can then be scrolled by manipulating the box.

Blomqvist, in U.S. Pat. No. 5,745,099, describes a method for positioning a cursor relative to a display using a pointing device. There, a reference position and cursor positions are selected, and offset values between the reference and cursor positions are computed and displayed.

SUMMARY OF THE INVENTION

The invention provides a method for moving a cursor on a display screen. A motion of an input pointing device is determined. The motion has a direction and a magnitude. The angle between the direction of the motion of the input pointing device and a reference direction is measured. A typical reference direction is horizontal or vertical.

A determination is made to see if the angle is between predetermined limits. If the direction of the motion of the pointing device is within the limits, then the magnitude of the motion of the pointer is multiplied by the cosine of the angle to determine the magnitude of the motion of the cursor along the reference direction.

DETAILED DESCRIPTION OF THE PREFERRED EMBODIMENT

Figure 1:
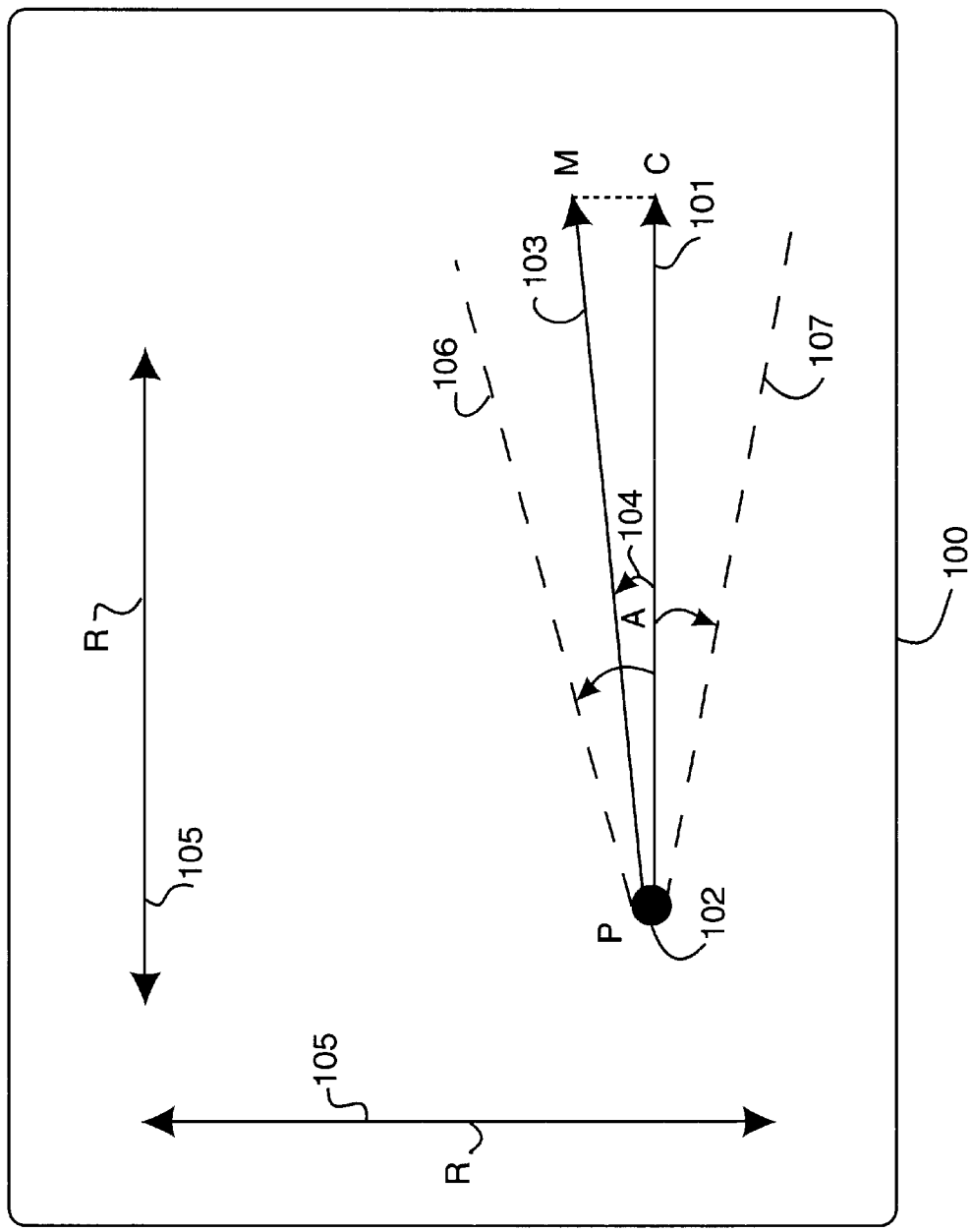
FIG. 1 is a diagrammatic of pointer and cursor motion according to the invention.

FIG. 1 shows a display screen 100 where the desired motion of a cursor (C) 101, either horizontal or vertical, beginning at a starting point (P) 102 is not always equal to the motion of a pointing device (M) 103. That is, it is difficult to keep the pointing device from drifting. It is desired to move the cursor exactly along a reference direction (R) 105, in this example, horizontal. In other words, it is desired to constrain the motion of the cursor to be horizontal even if the motion of the input device is not. This is useful for keeping cursors aligned with scroll bars on display screens.

To keep the cursor from drifting, it must be constrained while moving the pointing device. This constraint can be expressed as:

$$C=M*\cos(A)$$

where C is the constrained cursor motion, M is the magnitude of the full motion of the pointing device, and A is the angle 104 between the motion of the pointing device 103 and the reference direction 105.

Figure 2:
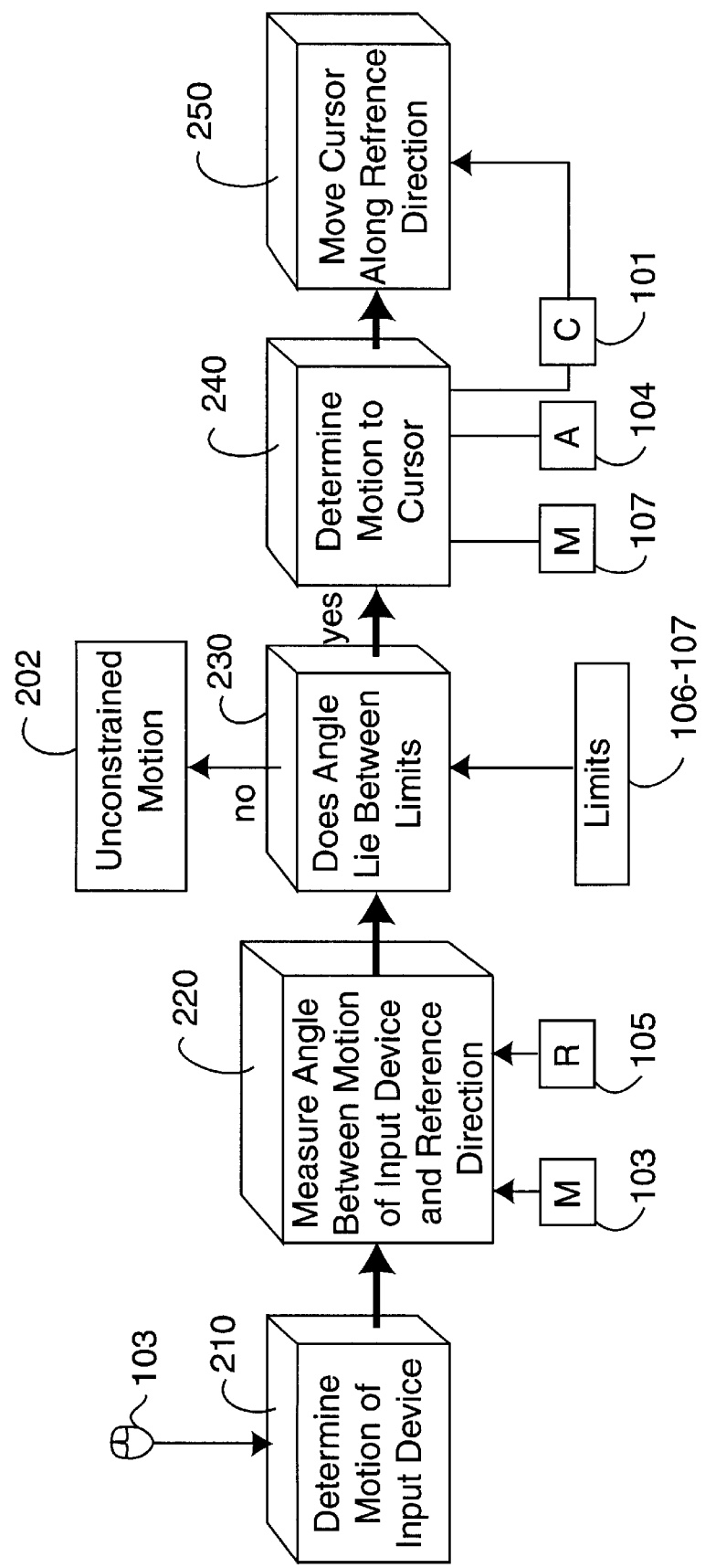
FIG. 2 is a flow diagram of a method for moving a cursor according to the invention.

FIG. 2 shows the steps of a method 200 that implements the above constraint. Step 210 determines the motion (M) 103 of the pointing device. The motion is expressed as its direction and magnitude. Step 220 measures the angle 104 between the motion of the cursor 103 and a reference direction 105.

Step 230 determines if the angle lies between limits 106–107. The limits can be set using, for example, a "mouse properties" input window. A typical prior art mouse properties window allows a user to set the button configuration, type of cursors, and speed of the cursor. A mouse properties window supporting the invention, also allows the user to set limits for horizontal and vertical reference direction, expressed for example, as an angle of deviation from these reference directions. If the angle is outside the limits, the motion of the pointing device is unconstrained 202.

Step 240 uses this angle to determine the constrained cursor motion by multiplying the magnitude of the pointer motion by the cosine of the angle as expressed above. Step 250 then moves the cursor in a direction corresponding to the reference direction.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for moving a cursor on a display screen, comprising the steps of:
   determining a motion of a pointing device, the motion having a direction and a magnitude;
   measuring the angle between the direction of the motion of the pointing device and a reference direction;
   determining if the angle is between limits; and
   if the angle is within the limits, then multiplying the magnitude of the motion of the pointing device by the cosine of the angle to determine the magnitude of the motion of the cursor along the reference direction that corresponds to a vertical scroll bar on the display screen.

2. A method for moving a cursor on a display screen, comprising the steps of:
   determining a motion of a pointing device, the motion having a direction and a magnitude;
   measuring the angle between the direction of the motion of the pointing device and a reference direction;
   determining if the angle is between limits; and
   if the angle is within the limits, then multiplying the magnitude of the motion of the pointing device by the cosine of the angle to determine the magnitude of the motion of the cursor along the reference direction that corresponds to horizontal lines of text on the display screen.

* * * * *